(12) United States Patent
Miyazaki et al.

(10) Patent No.: US 6,243,618 B1
(45) Date of Patent: Jun. 5, 2001

(54) METHOD OF MARKING NUMBER OR THE LIKE AND APPARATUS FOR MARKING THE SAME

(75) Inventors: Hirobumi Miyazaki; Shigeru Fukaura, both of Kumamoto (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/036,835

(22) Filed: Mar. 9, 1998

(30) Foreign Application Priority Data

Oct. 30, 1997 (JP) .................................... 9-298570
Oct. 30, 1997 (JP) .................................... 9-298613

(51) Int. Cl.⁷ .................................................. G06F 19/00

(52) U.S. Cl. ........................ 700/125; 700/96; 700/108; 700/135

(58) Field of Search .................................... 700/125, 108, 700/96, 130, 67, 68, 80, 83, 135; 714/719, 819, 821, 822, 824

(56) References Cited

U.S. PATENT DOCUMENTS 3,988,015 * 10/1976 Scantlin ..................................... 270/1
4,825,308 * 4/1989 Fukushima et al. .................... 360/46
5,241,483 * 8/1993 Poret et al. ........................... 700/125

(List continued on next page.)

FOREIGN PATENT DOCUMENTS

53130933 * 11/1978 (JP) .
61-49152    10/1986 (JP) .
63285483 * 11/1988 (JP) .

(List continued on next page.)

Primary Examiner—Thomas Lee
Assistant Examiner—Thuan Du
(74) Attorney, Agent, or Firm—Merchant & Gould P.C.

(57) ABSTRACT

A method of marking a number on a work. The number is read out by a data read-out means, the read-out data is electrically transmitted and returned in a secure manner, and a predetermined number is securely marked. The structure is made such that the chassis number is read out again at a time of reading out the chassis number from a pass card P on which the chassis number is displayed by a bar code reader (data read-out means) R and that the read-out data is transmitted to a sequence device (an arithmetic control apparatus) S so as to judge whether good or no good. Further, the data transmitted to a marking system (a marking means) M from the sequence device S is returned to the sequence device S from the marking system M so as to judge whether good or no good. Then, in the case that the received data is no good, the marking operation is stopped. Still further, after the data is transmitted to the marking system M from the sequence device S, it is possible to check the data within the marking system M without returning to the sequence device S from the marking system M. Furthermore, the read-out data is output to a personal computer B from the sequence device S, whether or not the read-out data is a number on the basis of a production control or the like checked in the personal computer, and the data is displayed on a display device. An erroneous judgment that a suitable character is erroneously judged as an unsuitable character at a time of judging whether good or no good is prevented by comparing the marked number with a standard data, and the structure is made such that a marked number or the like is read out by a mark read-out means, at a time of judging whether good or no good by comparing the read-out pattern with the registered pattern. An indefinite area slightly larger than a read-out error is provided in a boundary portion of whether good or no good, and in a case that the number or the like is judged to belong to the indefinite area, the number or the like is again judged for a plurality of times by a plurality of character or the like pattern previously registered, and thereafter in the case of being judged to still belong to the indefinite area, the judgment by viewing is performed.

7 Claims, 13 Drawing Sheets

U.S. PATENT DOCUMENTS

| | | | |
|---|---|---|---|
| 5,247,462 | * 9/1993 | Blasius et al. | 700/125 |
| 5,298,717 | * 3/1994 | DeRossett | 219/121.68 |
| 5,402,251 | * 3/1995 | Ogasawara et al. | 358/473 |
| 5,418,439 | * 5/1995 | Whang | 318/560 |
| 5,608,639 | * 3/1997 | Twardowski et al. | 700/125 |
| 5,701,000 | * 12/1997 | Suzuki | 235/462 |
| 5,896,292 | * 8/1999 | Hosaka et al. | 700/108 |
| 5,897,505 | * 4/1999 | Feinberg et al. | 600/547 |
| 5,901,161 | * 5/1999 | Du et al. | 371/211 |
| 5,942,740 | * 8/1999 | Watanabe et al. | 235/462.07 |
| 5,964,846 | * 10/1999 | Berry et al. | 709/400 |

FOREIGN PATENT DOCUMENTS

| | | | |
|---|---|---|---|
| 403142583 | * 6/1991 | (JP) | . |
| 8-138049 | 5/1996 | (JP) | . |
| 409069141 | * 3/1997 | (JP) | . |
| 9-193521 | 7/1997 | (JP) | . |

* cited by examiner

FIG. 3(A)

SCREEN DISPLAY IN NORMAL STATE

```
CURRENT DATA
    A B - 1 2 3 4 5 6 7 8 9 0 1 2 3 4
PRECEDING DATA
    A B - 1 2 3 4 5 6 7 8 9 0 1 2 3 3

TOTAL NUMBER OF MARKED BODIES : 1 2 3 4
   NUMBER OF MARKED BODIES BY CURRENT MODEL :    1 0 0
                                   MODEL : A B C
                                ABNORMAL : - - - -
```

FIG. 3(B)

SCREEN DISPLAY IN ABNORMAL STATE

```
CURRENT DATA
    A B - 1 2 3 4 5 6 7 8 9 0 1 2 3 5
                                    87% CONSISTENT
PRECEDING DATA
    A B - 1 2 3 4 5 6 7 8 9 0 1 2 3 4

TOTAL NUMBER OF MARKED BODIES : 1 2 3 5
   NUMBER OF MARKED BODIES BY CURRENT MODEL :    1 0 1
                                   MODEL : A B C
                                ABNORMAL : ABNORMAL IN QUALITY
```

REGISTERED CHARACTER

FIG. 4(B)

```
* * * *
    *
  *       ←THIS POINT IS SHIFTED

```
*   * * *   ←THIS POINT COMES OUT
      *
    *

```
    *
  * *
* *
    *
    *     CHARACTER ITSELF IS DIFFERENT
    *
    *
  * * *
```

FIG. 7

| COMPARISON OF PATTERN | MEASUREMENT OF MARKING STANDARD | RESULT OF JUDGEMENT |
|---|---|---|
| O K | O K | O K |
| O K | N G | N G |
| INDEFINITE | O K | JUDGEMENT BY VIEWING |
| INDEFINITE | N G | N G |
| N G | O K | N G |
| N G | N G | N G |

FIG. 12
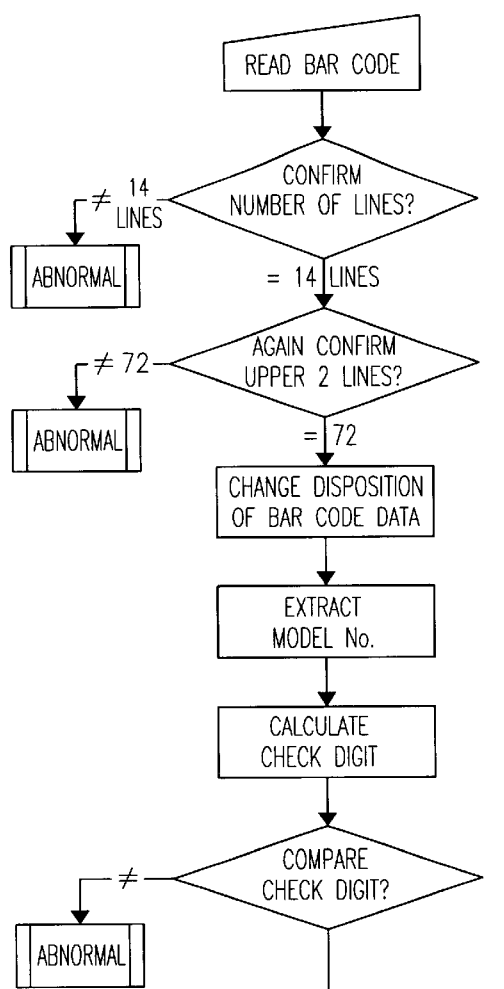
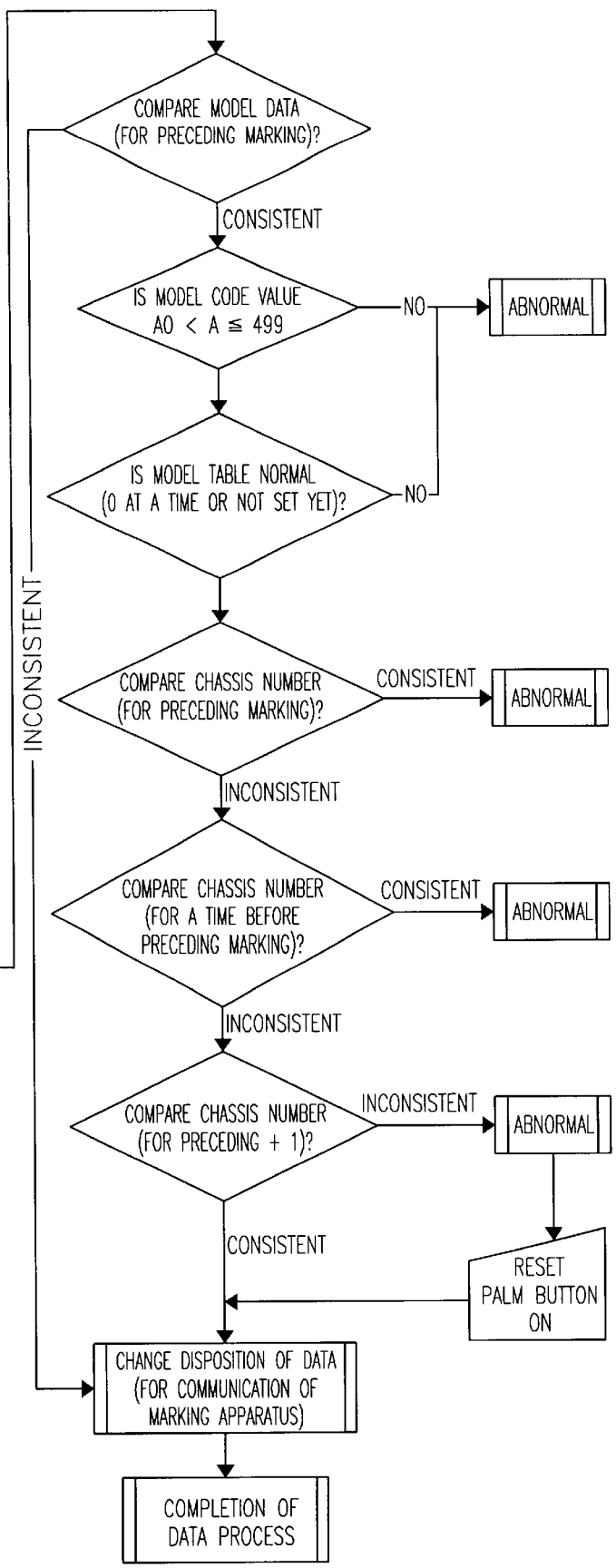

METHOD OF MARKING NUMBER OR THE LIKE AND APPARATUS FOR MARKING THE SAME

BACKGROUND OF THE INVENTION

1. Field of the Invention

The present invention relates to a marking method suitable for marking a chassis number to a body, for example, a body of a motorcycle and a marking apparatus.

2. Description of Related Art

Conventionally, as a method of marking a chassis number to a body of an automotive vehicle which is conveyed on an assembly line, for example, there has been known a technique described in Japanese Patent Examined Publication No. 61-49152.

In this technique, a label having coded information concerning a vehicle type, a vehicle number, an operation command and the like is attached to a vehicle body moving on an assembly line, and information necessary in each of the stations is read out by a bar code reader so that various kinds of operations are performed. In this technique, when a chassis number is marked on the vehicle chassis, a vehicle number is read out from the label by the bar code reader, the read-out data is transmitted to a marking apparatus through a control apparatus so as to set the marking apparatus in a state capable of marking the chassis number, and the set number is returned to the control apparatus so as to compare with the read-out data by the bar code reader, then the marking operation is performed.

However, in the above method, there is a possibility that an erroneous signal is read out by the bar code reader, and further there is a possibility that when the read-out signal is transmitted to the controller, the right data is not transmitted as an electric signal, so that it is not secured that the marking is performed on the basis of the complete right data.

On the contrary, there is a case that such a chassis number is marked as a dot character and the like by a dot marking apparatus, and further, there is a case that after marking to the vehicle body, in order to confirm whether or not the marking is performed in a suitable state, an inspection is performed by an optical sensor and the like. At this time, in order to solve a trouble that a defect is erroneously judged due to a slight difference as judged by viewing, for example, a technique is disclosed in Japanese Patent Unexamined Publication No. 8-138049 has been known.

In this technique, it is structured such that the dot character or the like as a subject to be inspected is read out and the read-out character or the like is compared with a normal character or the like pattern previously stored or a dot cancel character or the like pattern which is formed by canceling some dots from the normal character or the like pattern, so that when a predetermined rate of concordance is obtained, the dot character or the like is judged to be normal.

However, in the case of the above technique, a judgment whether good or no good is performed by simply comparing the measured character pattern with the standard character pattern and an effect of the measuring error and the like is not taken into consideration, so that in the case that the measuring error is great, there is a great possibility of performing an erroneous judgment.

Further, since a sound is generated when the chassis number or the like is marked, for example, on a metal frame or the like by this kind of marking apparatus, in order to prevent the sound, a method of marking the number while shutting a sound within an isolation chamber and the like is generally employed.

Still further, in this kind of marking apparatus, it is structured such that a door or the like which is freely opened and closed is provided in the isolation chamber or the like, and after opening the door or the like, the work is taken in and out by using a slide mechanism or the like, thereby performing the marking.

However, in the isolation chamber or the like mentioned above, at least two kinds of actuators consisting of an actuator for opening and closing the door or the like and an actuator for taking the work in and out are required, and an operation of taking the work in and out and an operation of opening and closing the door or the like are separately performed, so that there is a problem that a time loss is produced.

SUMMARY OF THE INVENTION

The present invention is made by taking the above problems into consideration. A first object of the present invention is to securely read out a number by a data read-out means, electrically transmit and return the read-out data in a secure manner and securely mark a predetermined number.

Further, a second object of the present invention is to read out the marked number or the like by a mark read-out means, and prevent an erroneous judgment that a suitable character is erroneously judged as a unsuitable character at a time of judging whether good or no good by comparing the marked number with a standard data.

Still further, a third object of the present invention is to provide a simple marking apparatus which can efficiently take a work in and out a processing chamber in the marking apparatus for preventing a sound generated at a time of marking.

In order to achieve the above first object, in accordance with the present invention, there is provided a method of marking a number or the like comprising a step of reading out a number or the like from a card on which the number or the like is displayed by a data read-out means for a plurality of times, a step of inputting each of the read-out data to an arithmetic control apparatus so as to judge whether or not each of the data coincides, a step of transmitting the data to a marking means and returning a received data to the arithmetic control apparatus from the marking means so as to judge whether or not the transmitting data is good, and a step of controlling the marking means in such a manner as to stop a marking operation by the marking means in the case that the received data is not good.

In this case, the marking data is transmitted to the marking means from the data read-out means through the arithmetic control apparatus, however, whether or not the data is properly read out by the data read-out means and the data is properly transmitted to the arithmetic control apparatus is checked by reading out by the data read-out means for a plurality of times and transmitting each of the data to the arithmetic control apparatus so as to compare the both with each other.

Further, whether or not the data is properly transmitted to the marking means from the arithmetic control apparatus is checked by comparing the transmitted data with the data returned from the marking means.

Then, an error in marking can be prevented by checking whether or not an electric communication from the data read-out means to the marking means is proper.

In this case, the method of marking the number or the like mentioned above can be applied to, for example, a marking a chassis number for a motor cycle or the like.

Further, in accordance with another aspect of the present invention, there is provided a method of marking a number or the like comprising a step of reading out a number or the like from a card on which the number or the like is displayed by a data read-out means for a plurality of times, a step of inputting each of the read-out data to an arithmetic control apparatus so as to judge whether or not each of the data coincides, a step of transmitting the data to a marking means so that the marking means judges whether or not the transmitting data is good, and a step of controlling the marking means in such a manner as to stop a marking operation by the marking means in the case that the received data is not good.

Then, in this case, in place of returning the data from the marking means, a method, for example, using a check digit is employed, so that the check of the returned data can be performed with in the marking means. Accordingly, there turning from the marking means can be omitted, however, the error in marking can be prevented as in the same manner as that of the embodiment mentioned above.

Still further, in accordance with the other aspect of the present invention, there is provided a method of marking a number or the like, in which the same data as the data transmitted to the marking means from the arithmetic control apparatus is input to a computer, whether or not the data is good is judged by comparing the data with a number or the like independently input to the computer, and when the data is not consistent with the number, the marking means is controlled to stop the marking operation.

In this case, the number or the like input to the computer corresponds to, for example, in the case of being applied to an assembly line for a vehicle, a chassis number or the like given on the basis of a production control data, which is previously input to the computer in an on-line manner or an off-line manner, and the check is performed by comparing with the number or the like.

Furthermore, in accordance with further the other aspect of the present invention, there is provided a method of marking a number or the like, in which the data transmitted to the computer is displayed on a display device.

In this case, the number or the like can be checked by viewing by displaying the preceding number or the like read out, for example, by a bar code and the present number or the like in a two-step manner or by displaying the data transmitted to the marking means from the arithmetic control apparatus and the data returned from the marking means in a two-step manner or the like. Further, in the case of an abnormal condition such as an inconsistent or the like, it is convenient that an abnormal portion can be easily found, for example, by changing a color or the like.

Moreover, in accordance with still further the other aspect of the present invention, there is provided a method of marking a number or the like, in which in the case that the data is not consistent, an alarm is produced.

In this case, the alarm is, for example, a buzzer, a light emitting signal or the like, and is a means for awakening an attention of an operator.

Further, in accordance with the other aspect of the present invention, there is provided a method of marking a number or the like, in which whether or not the data is good is judged with including a regulation degree of the number or the like.

In this case, the regulation degree of the number or the like is a series of numbers or the like structured such as to add one by one in every times, for example, when the preceding number is 100, the present number is 101, and it is convenient, for example, when this is applied to the marking operation of the chassis number with respect to the motor cycle or the like.

Still further, in accordance with the other aspect of the present invention, there is provided a method of marking a number or the like, in which the marking means is a dot marking apparatus.

When the dot marking apparatus is employed, an adjustment to an electric data or the like can be achieved, so that the marking means can be structured to be compact.

Furthermore, in accordance with further the other aspect of the present invention, there is provided a method of marking a number or the like, in which the number or the like marked by the marking means is read out by the marking read-out means, is transmitted to the arithmetic control apparatus or the computer, and is compared with the standard data so as to judge whether good or no good.

When the judgment of whether good or no good is performed by comparing with the standard data, the judgment of whether good or no good can be properly performed.

Moreover, in accordance with still further the other aspect of the present invention, there is provided a method of marking a number or the like, in which when the judgment of whether good or no good is performed by comparing with the standard data, the judgment is performed by combining at least a marking accuracy and a pattern matching degree of a character or the like.

In this case, the marking accuracy is that, for example, whether or not the dot is marked at an accurate position, or whether or not a depth and an inclination of the mark is proper, and in the pattern matching degree of the character or the like, a whole pattern of the character or the like consisting of a set of dots and a pattern of the character or the like itself are subjects to be judged.

Then, when whether good or no good is judged by combining a plurality of judging methods, an accuracy can be more increased.

Further, in order to achieve the second object mentioned above, in accordance with the present invention, there is provided a method of marking a number or the like, in which at a time of performing a judgment whether good or no good on the basis of the pattern matching degree, an indefinite area slightly larger than a read-out error is provided in a boundary portion for the judgment whether good or no good in a judgment standard, the character or the like judged to belong to the indefinite area is again judged for a plurality of times by a plurality of character or the like patterns previously registered, and thereafter in the case of being judged to still belong to the indefinite area, the judgment by viewing is performed.

In this case, in the case that the judgment of whether good or no good is performed by reading out the character or the like and comparing with the pattern of the standard data, it is necessary to take an error in reading out by the mark read-out means into consideration. Accordingly, in order to always judge the no good character or the like to be no good, it is necessary to move the judgment level of whether good or no good of the judgment standard to the no good area end at a degree of read-out error, and in the case that the read-out error is sufficiently smaller than the read-out value, there is hardly generated a problem, however, in the case that the read-out error is increased, the read-out error can not be ignored. Then, in the case that the read-out error is particularly large, when the level for judging whether good or no good is moved to the no good area end, there necessarily occurs a number of matters that the good character or the like is erroneously judged to be a no good character or the like.

Accordingly, the indefinite area slightly larger than the read-out error is provided in the boundary portion between the good area and the no good area of the judgment standard, the character or the like judged to belong to the indefinite area is again judged for a plurality of times by a plurality of character or the like patterns previously registered, and thereafter in the case of being judged to still belong to the indefinite area, the judgment by viewing is performed, so that the good character or the like is prevented from being erroneously judged to be a no good character or the like.

Still further, in order to achieve the third object mentioned above, in accordance with the present invention, there is provided a marking apparatus in which at least one side wall of a processing chamber surrounded by a peripheral wall in a sealed state is made a rotating wall, the rotating wall is rotated so as to simultaneously take a work into the processing chamber and take out the work from the processing chamber, and at a time when the taking in and out of the work is completed, the processing chamber is closed in a sealed manner.

When the taking the work into the processing chamber and the taking out the work from the processing chamber are simultaneously performed by rotating the rotating wall, an operation corresponding to an open and close operation of the door or the like and the taking the work into the processing chamber are performed by a single drive source, and a time loss is not produced.

Further, when the marking operation is performed in a state that the work is taken into and the processing chamber is closed in a sealed manner, the sound is not leaked outward.

Still further, in accordance with another aspect of the present invention, there is provided a marking apparatus, in which the rotating wall is mounted to a rotating table disposed in the boundary portion between the processing chamber and the work set portion so that a table surface area is separated into a plurality of areas by the rotating wall, and a work set jig is disposed in each of the separated table surface areas.

As mentioned above, the work set jig is provided in each of the table surface areas separated by the rotating wall, so that, for example, in the work set portion, during the operator or the like sets the work in the work set jig, the mark is given to the work held by the work set jig with in the processing chamber, and thereafter, the taking the set work into and the taking out the marked work can be simultaneously performed by rotating the rotating table.

In this case, the separation of the table surface area by the rotating wall may be two areas or more.

BRIEF DESCRIPTION OF THE DRAWINGS

FIGS. 3A and 3B are schematic views showing a display example of a display device, in which FIG. 3A shows a display example at a normal state and FIG. 3B shows a display example at an abnormal state;

FIGS. 4(A)–(D) are schematic views which show various kinds of examples at a time when the marking state is abnormal;

FIG. 7 is a table which shows an example in the case that a judgment of whether good or no good in the marking state is judged by a combination of the pattern matching degree and a marking accuracy;

FIG. 12 is a flow chart which shows a bar code judging portion in FIG. 11 in detail.

DESCRIPTION OF THE PREFERRED EMBODIMENTS

A preferred embodiment in accordance with the present invention will be described below with reference to the attached drawings.

A method of marking a number or the like in accordance with the present invention is applied to, for example, a method of marking a chassis number to a vehicle body of a motorcycle or the like. The chassis number of this kind is set on the basis of a predetermined production schedule, the chassis number and a coded bar code information concerning a vehicle type or the like are displayed on a card called a pass card, and the pass card and the vehicle body are conveyed together.

Figure 1:
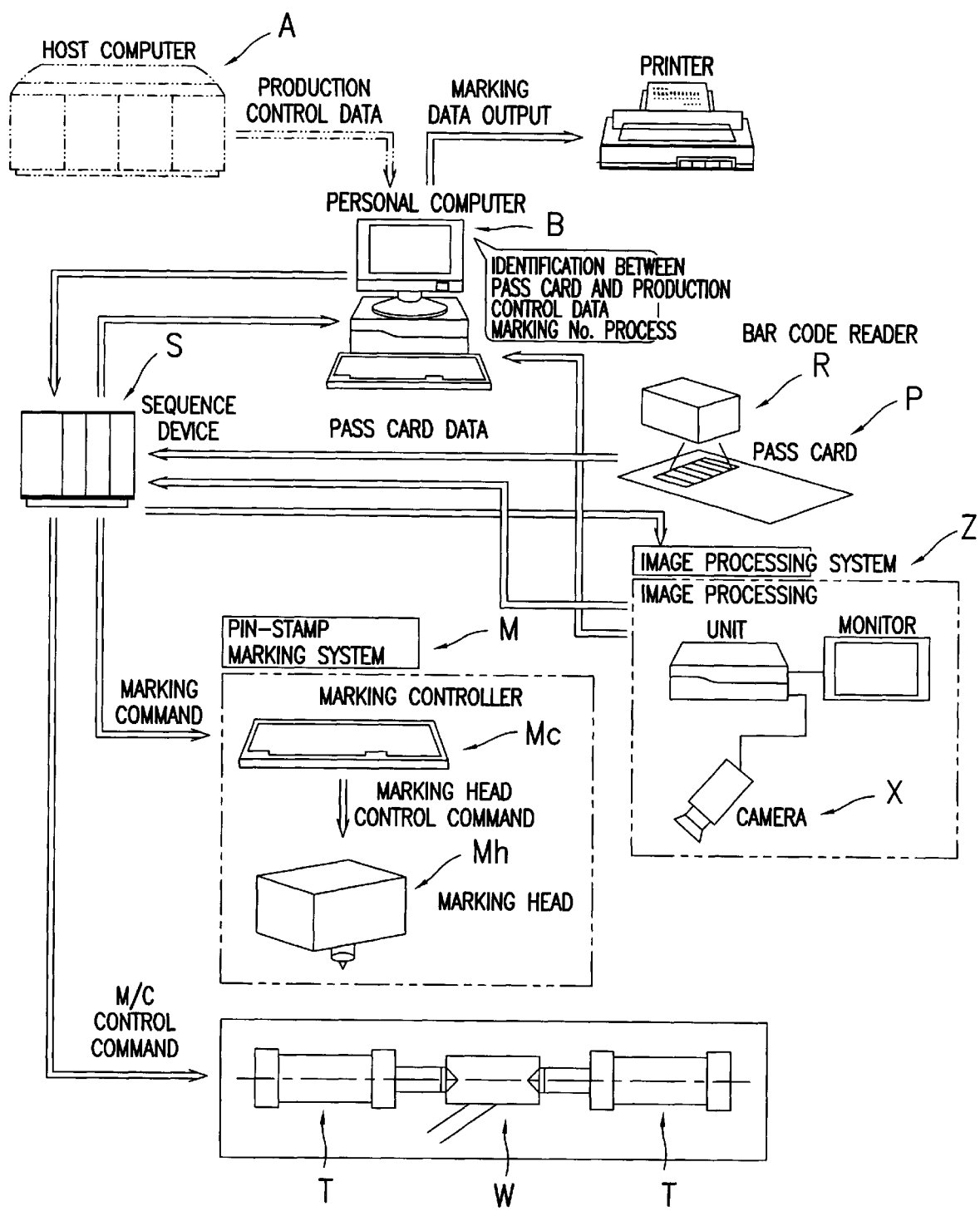
FIG. 1 is a schematic view which shows a system in accordance with a method of marking a number of the present invention

In a station for marking the chassis number, as shown in FIG. 1, there are disposed a positioning means (a work set jig) T for positioning a vehicle frame W as a work and a pin-stamp marking system M as a marking means for marking the chassis number to the positioned vehicle frame W, and the marking system M is provided with a marking head (a marking apparatus) Mh for marking the chassis number in a dot manner on the basis of a control command by a marking controller Mc.

Further, in the marking station, there is provided a bar code reader R serving as a data read-out means for reading out the chassis number displayed on a pass card P conveyed together with the vehicle frame W, an optical sensor X constituted by a camera or the like serving as a mark read-out means for reading out the marked character or the like and an image processing system Z for processing an image of the read-out data. The marking station is structured such as to transmit the data read out by the bar code reader R to the marking system M through a sequence device S serving as an arithmetic control apparatus and to transmit the image processed data in the image processing system Z finally reading out the marked character or the like to the sequence device S and a personal computer B mentioned below.

Accordingly, the personal computer B is connected to a host computer A and is disposed in the marking station, and an output portion such as a display device, a printer or the like is provided in the personal computer B.

Figure 2:
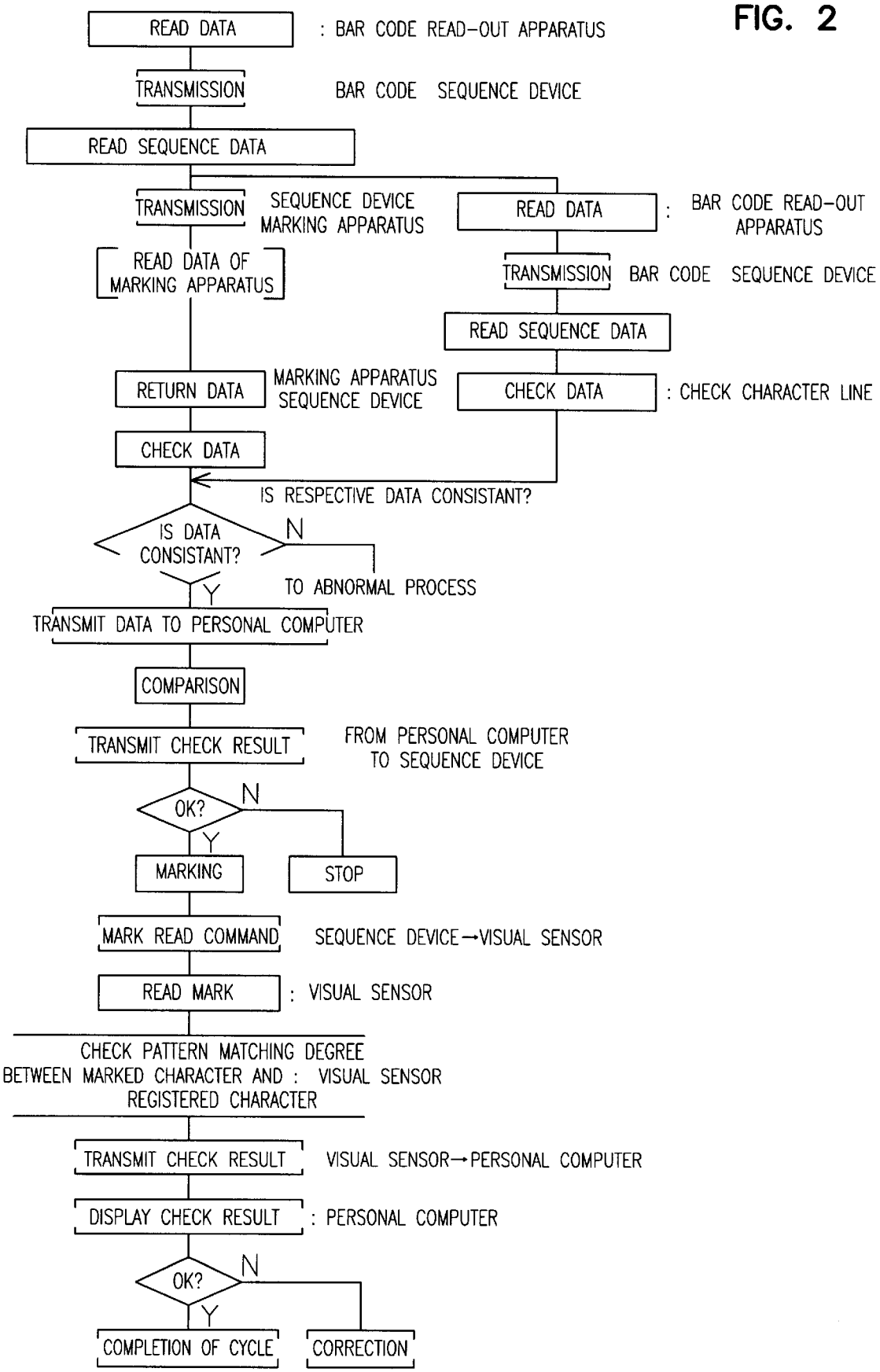
FIG. 2 is a flow a chart of the marking method.

Next, a control method by the system structure mentioned above will be described below with reference to FIGS. 1 and 2.

At first, the bar code reader R reads the chassis number displayed on the pass card P two times. In this case, taking a cycle time into consideration, a process is started from reading out the data at a first time, and then the read-out data is transmitted to the sequence device S and the sequence device S transmits the data to the personal computer B at the same time of transmitting the same data to the marking system M.

Then, the marking system M returns the received data to the sequence device S.

The bar code reader R performs a second time of reading out during the above time, and transmits the data to the sequence device S.

Then, the sequence device S transmits the data to the personal computer B and compares the data at the first time with the data at the second time so as to inspect whether or not the data is consistent with each other, and thereafter, performs an inspection by comparing with the data returned from the marking systemM. Then, in the case that they are not consistent with each other, the information is output to the personal computer B and the marking system M, so that an abnormal state is displayed, an alarm is generated, for example, by a buzzer and the marking operation is stopped.

The personal computer B compares the data at the first time with the data at the second time in the same manner so as to inspect whether or not the data is consistent with each other, and performs an inspection by comparing with the chassis number data from the production control data transmitted from the host computer A. Then, in the case that they are not consistent with each other, an abnormal state is displayed in the same manner, the information is output to the sequence device S, the alarm is generated, for example, by the buzzer, and the marking operation is stopped.

In this case, at a time of comparing and inspecting by the sequence device S and the personal computer B, a comparison with the preceding read-out data is simultaneously performed.

Accordingly, the case of the preceding read-out number plus 1 is proper, and the result of the preceding read-out number and the current read-out number is displayed on the display device. For example, in the case that the result is not proper, the information is output.

An example of the displayed result is shown in FIGS. 3A and 3B, in the case that the result is normal, the current data is displayed in an upper step and the preceding data is displayed in a lower step respectively by a black color.

Further, when the abnormal state is generated as a result of the comparison, as shown in FIG. 3B, the character or the like detected as a difference is displayed by a red color (in the drawing, for the purpose of explanation, a highlighting character is used for display), and when the number is different, the character or the like is displayed by a yellow color.

This kind of process is generally performed by a start of marking, and in the case that the abnormal state is generated, the marking operation is not performed.

In the embodiment mentioned above, the data transmitted to the marking system M is returned to the sequence device S and checked so as to be electrically secured, however, it is possible that the check of the returned data is performed in the marking system M by a method using a check digit. In this case, the return from the marking system is not required.

Next, after the marking is performed, a quality of the character or the like is checked. The check is performed by using the optical sensor X (a camera) in the image processing system Z shown in FIG. 1. The judgment of whether good or no good is performed by processing the image in the image processing unit after reading out the character or the like marked in a dot manner, outputting the data to the sequence device S and the personal computer B and comparing with the registered character or the like.

At this time, in accordance with the embodiment, whether good or no good is judged by a combination of the marking accuracy and the pattern accuracy.

In this case, the judgment of the marking accuracy is performed by comparing with a predetermined pin marking standard, and in the marking standard, for example, a standard value with respect to each of a depth of the mark, an inclination of the mark, a position of the marking character and the like is determined.

For example, in the case that an original dot position of a numeral 7 registered in the personal computer B or the like is a position shown in FIG. 4A, when a position of a part of the dot is shifted as shown in FIG. 4B, or when a part of the dot comes out as shown in FIG. 4C, the marking accuracy is judged to be no good.

Further, in the case of the judgment on the basis of the pattern matching, for example, in the case that the character itself is different so that a numeral 1 is marked as shown in FIG. 4D, since the pattern degree is not consistent, the character is judged to be abnormal and displayed, accordingly. However, for example, in the case of reading out the character such as AF27-486032 by the optical sensor X, regarding the character having a similar shape such as a numeral 3 and a numeral 8, when the character can be read out as both of them, a probability that the character is processed to be a no good character is increased, so that there occurs a matter that the character judged to be no good becomes a proper character by another measurement. Further, in the case that the position of the dot is slightly shifted, the same matter is also generated.

Accordingly, in accordance with the present invention, particularly in the case that the read-out accuracy is low, an area which can not be judged by the mark read-out means is set to be an indefinite area, the character or the like judged to be within the indefinite area is again judged for predetermined times by the previously registered plural character or the like patterns, and when the character is still judged to be within the indefinite area, the character is confirmed by viewing, so that the judgment can be made proper.

Figure 5:
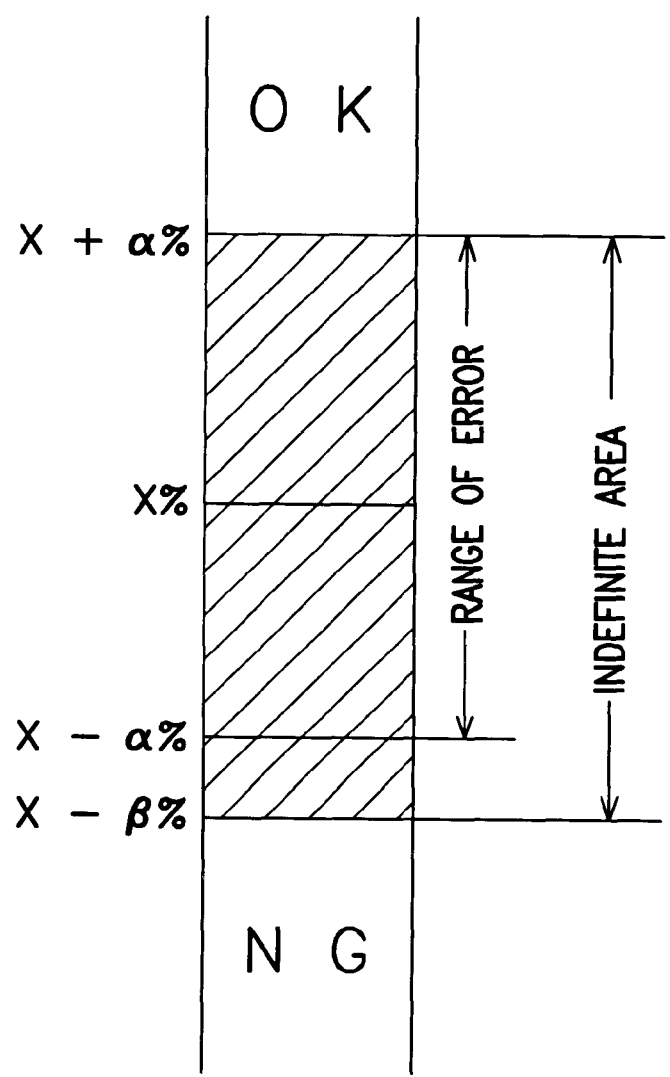
FIG. 5 is a schematic view which shows an example of a judgment standard of whether good or no good on the basis of a pattern matching degree in the marking state.

Accordingly, as shown in FIG. 5, for example, when a true standard for judging whether good or no good is x % and a measurement error of the mark read-out means is ±α%, the indefinite area (a hatching area) larger than the measurement error is provided and an upper limit of the indefinite area is set to correspond with a line of x+α%, so that an area from (x−β%) to (x+α%) is made the indefinite area.

Then, in the case that the matching degree is equal to or more than x+α%, the character is judged to be good, and in the case that the matching degree is equal to or less than x−β%, the character is judged to be no good. Accordingly, an influence of the measurement error can be removed and a trouble that the good character is judged to be no good or the no good character is judged to be good can be removed.

Further, in the case that the character is judged to be within the indefinite area, the matching degree thereof is again judged on the basis of the different registered character or the like pattern.

Figure 6:
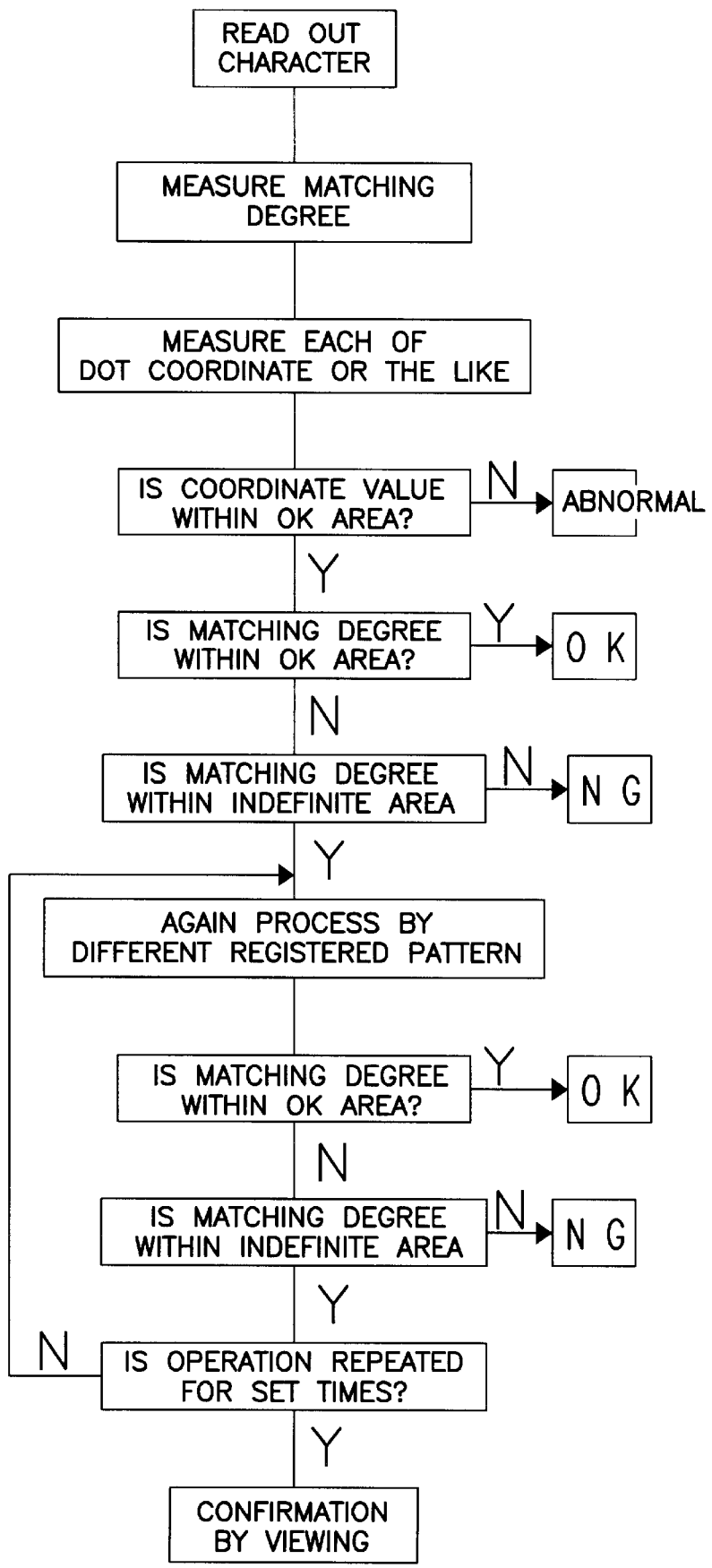
FIG. 6 is a flow chart which shows an example of a processing flow of whether good or no good in the marking state.

Putting the method of judging whether good or no good mentioned above together, it is shown in FIG. 6. Accordingly, at first, the character or the like is read out by the optical sensor X, the measurement of the pattern matching degree and the measurement of the coordinate or the like of each of the dots are performed, and when the coordinate value is without the good area, it is judged to be no good. On the contrary, when the coordinate value is within the good area, whether or not the pattern matching degree is within the good area (equal to or more than x+α% in FIG. 5) is judged, so that when the matching degree is within the good area, it is judged to be good.

In the case that the pattern matching degree is without the good area (equal to or less than x+α% in FIG. 5), whether or not the matching degree is within the indefinite area (from x+α% to x−β% in FIG. 5) is judged, and when the matching degree is without the indefinite area, it is judged to be no good. Further, when the matching degree is within the indefinite area, the judgment is again performed on the basis of the different character pattern. Accordingly, whether or not the matching degree is within the good area by comparing with the different registered character pattern is judged, and when the matching degree is within the good area, it is judged to be good. Further, when the matching degree is without the good area, whether or not the matching degree is within the indefinite area is judged, so that when the matching degree is without the indefinite area, it is judged to be no good, and when the matching degree is within the indefinite area, the same process is again performed on the basis of the next different registered pattern. Accordingly, the inspection mentioned above is repeated for predetermined times. As a result, with respect to the character finally remaining as the indefinite area, whether or not it is truly no good is confirmed by viewing.

In this case, when the abnormal state on the basis of the pattern recognition is generated, a level of the pattern matching degree of the character or the like having the abnormality is displayed on the screen so as to be used for a reference at a time of viewing confirmation. Accordingly, the operator can easily check by viewing on the basis of the display on the screen.

Further, an example of a combination between a result of judgment on the basis of the pattern recognition by the optical sensor X and a result of judgment on the basis of the marking accuracy mentioned above is shown in FIG. 7.

Accordingly, in the case that any one of them is no good, the final judgment is set to be no good and in the case that both of them are good, the judgment is set to be good. Further, in the case that the judgment result on the basis of the pattern comparison is the indefinite area and the judgment result on the basis of the marking accuracy is good, after the judgment is again performed on the basis of a plurality of character patterns for the predetermined times, it is finally judged by viewing.

Next, a marking apparatus in accordance with the present invention will be described below with reference to FIGS. 8 to 13.

Figure 8:
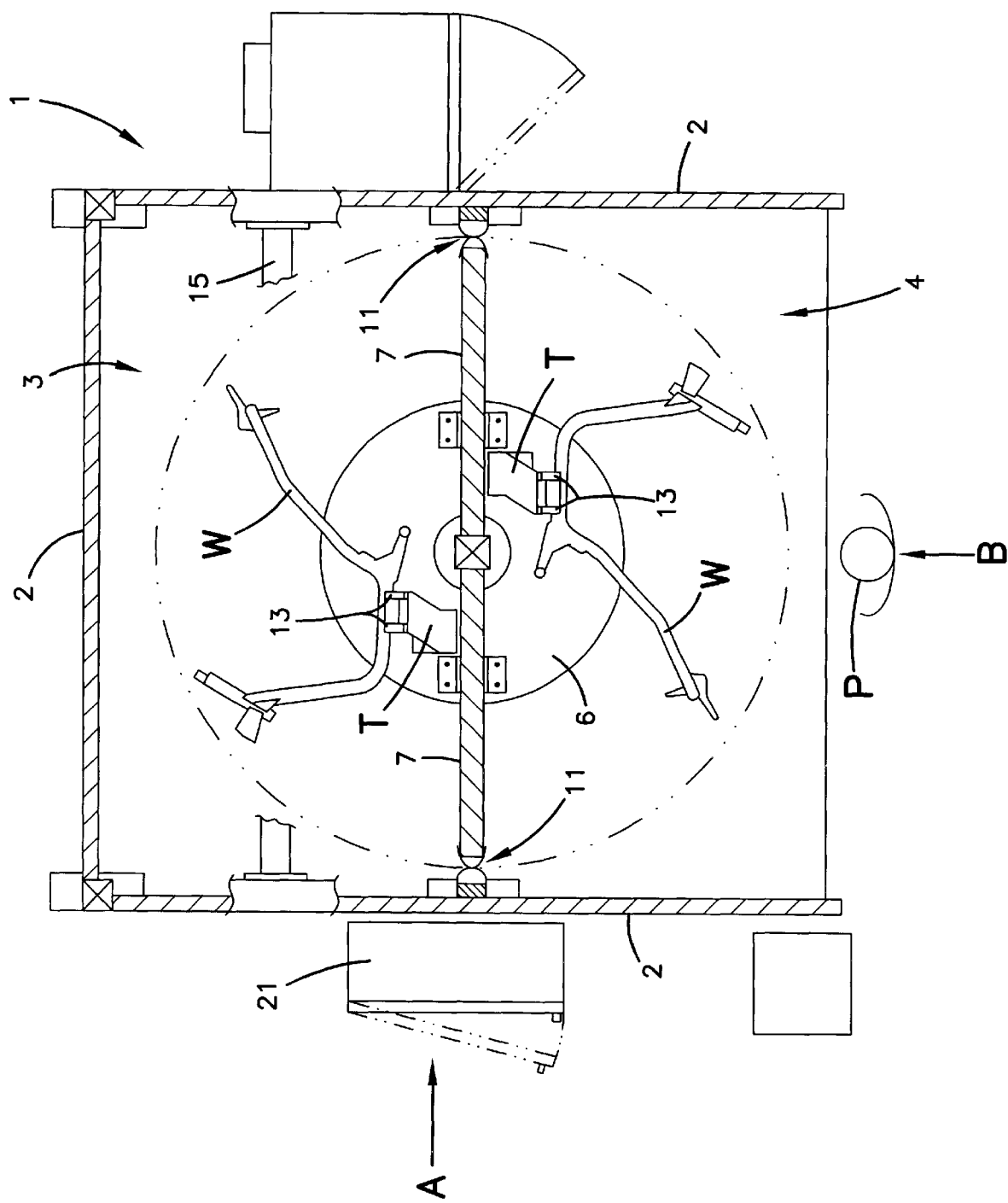
FIG. 8 is a plan view which shows a processing apparatus in accordance with the present invention.
Figure 9:
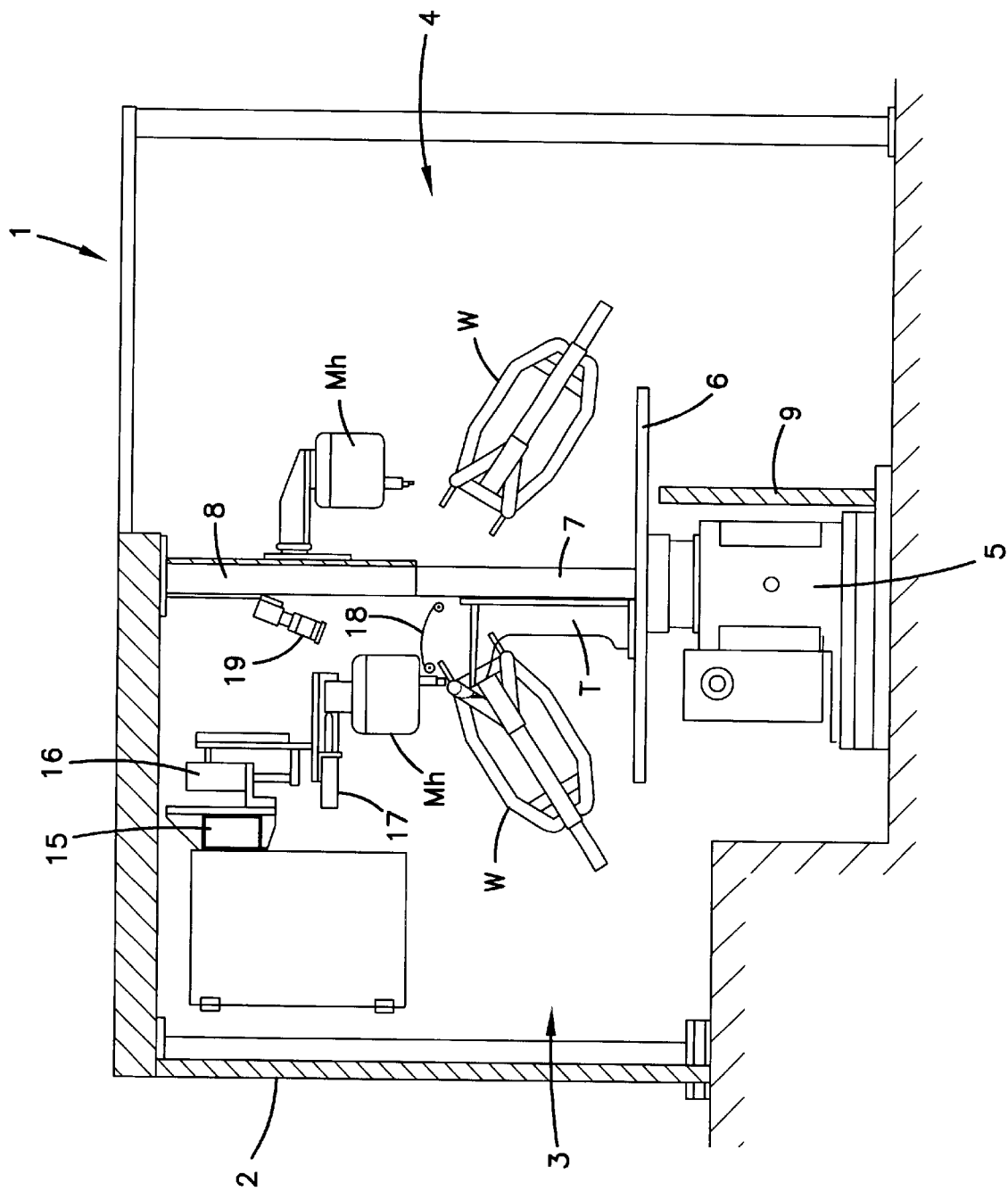
FIG. 9 is a side elevational view as seen from a direction A in FIG. 8.
Figure 10:
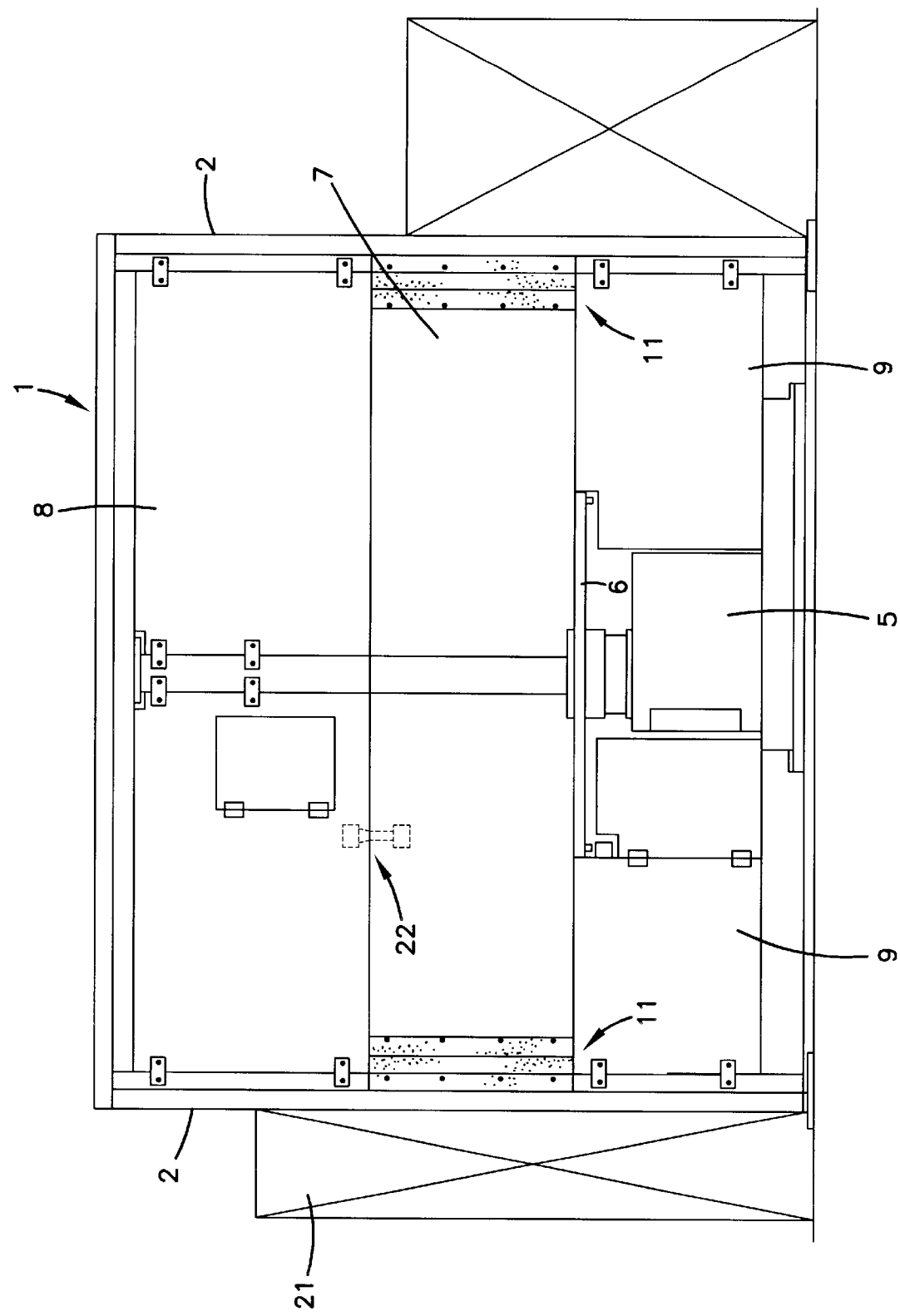
FIG. 10 is a side elevational view as seen from a direction B in FIG. 8.

The marking apparatus 1 is structured as a rectangular chamber, three peripheral portions and an upper portion of which are surrounded by an outer wall 2, as shown in FIGS. 8 to 10. The marking apparatus 1 is provided with a processing chamber 3 which is separated at a center portion so as to be defined as a sealed chamber and a work set chamber 4 which is defined as a chamber having a surface open among peripheral surfaces. Further, a rotating table 6 which freely rotates around a vertical axis by a rotation drive source 5 is disposed in a boundary portion between the both.

Then, a rotating wall 7 which parts the processing chamber 3 from the work set chamber 4 at a middle height is mounted to the rotating table 6 so as to be rotated together with the rotating table 6, and a fixed wall 8 which parts the processing chamber 3 from the work set chamber 4 is fixed to the upper portion of the rotating wall 7 and a fixed wall 9 is also provided in the lower portion of the rotating wall 7.

Further, the rotating wall 7 is structured to be a sound protection and sound shielding structure wall having an opposing constitution so as to shield a sound between the processing chamber 3 and the work set chamber 4, and at an upper end portion in the middle of the rotating wall 7 and at a lower end portion in the middle of the fixed wall 8, a sensor 22 for confirming a position of the rotating table 6 is provided.

Then, at a contact portion between the rotating wall 7 and the outer wall 2, a seal member 11, for example, made of rubber is disposed, so that no gap is generated between the rotating wall 7 and the outer wall 2 and it is considered that no gap is generated between the rotating wall 7 and the fixed wall 8 and between the rotating wall 7 and the partition wall 9.

Still further, the work set jigs T and T disposed on both sides of the rotating table 6 with respect to the rotating wall 7, and a clamp device 13 (refer to FIG. 8) for positioning and clamping the vehicle frame W is provided on each of the work set jigs T. (In FIG. 9, the work set jig T close to the work set chamber 4 is omitted.)

The marking apparatus Mh is mounted to the inner portion of the processing chamber 3.

The marking apparatus Mh is mounted to a mounting frame 15 horizontally provided in the processing chamber 3 in such a manner as to freely move to a vertical direction by a drive source for ascent and descent 16 and in such a manner as to freely move to an advance or retreat direction by a horizontal drive source.

Furthermore, a lighting device 18 for lighting a marking portion in the vehicle frame W is mounted to the inner portion of the fixed wall 7 close to the processing chamber 3, and the optical sensor X is mounted to the upper portion of the lighting device 18. Accordingly, the lighting device 18 is used for lighting the marking portion so as to confirm by the optical sensor X.

The work set chamber 4 is structured such that the operator P is placed at a portion having no outer wall 2 and can perform a clamp and unclamp operation of the vehicle frame W with respect to the work set jig T.

Moreover, an auxiliary marking apparatus Mh is mounted to the fixed wall 7 close to the work set chamber 4, and is set in a state capable of marking to the vehicle frame as it is, for example, when the normal marking apparatus Mh is out of order.

A control panel 21 for controlling the rotation drive source 5, controlling the drive of the marking apparatus Mh and the like is provided in the outer side of the processing apparatus 1, and further, a inspection window or the like is properly provided in a predetermined portion of the outer wall 2.

Figure 11:
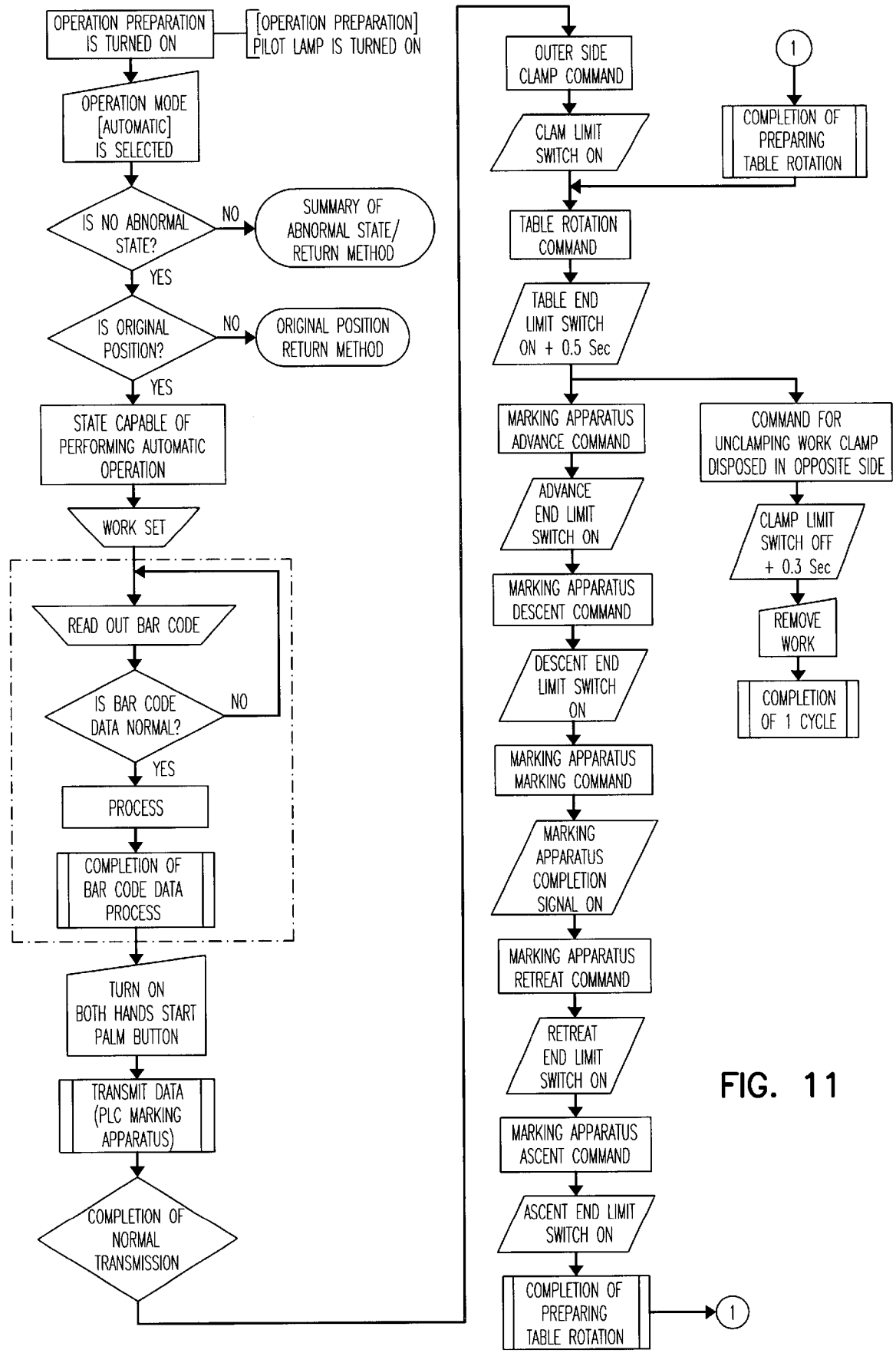
FIG. 11 is a flow chart of operating the marking apparatus.

Next, a process flow at a time of automatically operating the marking apparatus 1 will be described below with reference to FIG. 11.

When a preparation for operating the apparatus is completed, a light indicating a preparation completion is turned on, thereby informing the operator P.

Then, the operator P selects a operation mode to an automatic mode.

Here, whether or not an abnormal state is generated in the system and whether or not the position of each of the rotating table 6, rotating wall 7 and the like is in the original position are checked, and in the case that there is the abnormal state, a return means is performed. As a result, when there is no abnormal state, an automatic operation can be performed.

Next, when the vehicle frame W is set and prepared in the work set chamber 4 by the operator, a chassis number or the like coded as a bar code is read out from a production indicating card or the like flowing on the line together with the vehicle frame W. Then, whether or not the chassis number or the like is normal is judged in accordance with a bar code judgment flow chart mentioned below.

In this case, when the normality of the bar code data is confirmed, a start button operated by both hands is pressed by the operator P and the read-out data is transmitted to the marking apparatus Mh. Then, when the data transmission is normal, a clamp command is output so that the set vehicle frame W is automatically clamped by the clamp device 13, a clamp limit switch is operated, and thereafter, a table rotation command is output to the rotating table 6 in a state that the rotation preparation is completed.

The rotation drive source 5 is operated by the table rotation command, so that the rotating table 6 and the rotating wall 7 are rotated at 180 degrees. Then, after predetermined seconds pass from a time of an operation of the sensor 22 of the rotating wall 7, an advance command is output to the marking apparatus Mh within the processing chamber 3, and in the work set chamber 4 end, an unclamp command is simultaneously output to the work set jig T.

As a result, in the work set chamber 4 end, the vehicle frame is unclamped and the clamp limit switch is turned off, so that the vehicle frame W is removed by the operator P, thereby completing a cycle.

On the contrary, in the inner side of the processing chamber 3, when the marking apparatus Mh reaches an advancing end, the limit switch is operated, so that a descent command is output to the marking apparatus Mh at this time. When the limit switch is operated at a descent end, a marking command is output so that the marking is performed. When the marking is completed, a retreat command and an ascent command is output to the marking apparatus Mh, so that the marking apparatus Mh is returned to the original state and the rotation preparation of the rotating table 6 is completed.

In this case, the judgment of the bar code is performed by a flow chart shown in FIG. 12.

At first, after the bar code is read so that a number of digits thereof is confirmed, values of the two digits disposed in predetermined upstream positions are confirmed. When any abnormal state is confirmed here, the abnormal state is processed in accordance with a predetermined abnormal state processing method, so that when it is normal, after the disposition of the bar codes is changed so as to extract the apparatus type number and a check digit calculation is performed so that a certainty of the data is judged by a comparison of the check digit, the apparatus type number is confirmed by comparing with the data marked at the preceding time.

When the mark is consistent with the apparatus type number marked at the preceding time, an operation for marking the chassis number in the successive number is performed, and when the mark is different from the apparatus type number marked at the preceding time, an operation for marking the chassis number in accordance with a new apparatus type number is performed.

As the operation for marking the number with respect to the same type apparatus in the successive number, whether or not the apparatus type code value is included within a predetermined standard range is checked and whether or not the apparatus type code value is normal in comparison with the apparatus type table. When it is abnormal, it is operated by a predetermined abnormality process method, and when it is normal, that it is inconsistent in comparison with the chassis number marked at the preceding time is confirmed, and thereafter, that it is inconsistent in comparison with the chassis number marked at the time one time before the preceding time is confirmed. Here, in the case that it is consistent with the chassis number at the preceding time or the time one time before the preceding time, it is operated by a predetermined abnormality process method.

Further, when it is inconsistent with the number marked at the preceding time or the time one time before the preceding time, that the chassis number becomes the preceding chassis number plus 1 is confirmed, and when it is normal, the disposition of the data is changed and the data process is completed.

It is structured such that the data read out from the bar code is judged by the procedure mentioned above, so that the accurate chassis number or the like is transmitted to the marking apparatus Mh and the marking is performed.

In the marking apparatus structure in the above manner, the vehicle frame W is set to the work set jig T in the work set chamber 4, the vehicle frame W can be taken in the processing chamber 3 and the processed vehicle frame W can be taken out therefrom simply by rotating the rotating table 6, and the processing chamber 3 can be sealed at the same time, so that the sound within the processing chamber 3 can be efficiently shut and the operation environment can be made good. Further, since the operation of taking the vehicle frame W in and the open and close operation of the processing chamber 3 are performed by a single drive source, the cost required for the apparatus is inexpensive.

Figure 13:
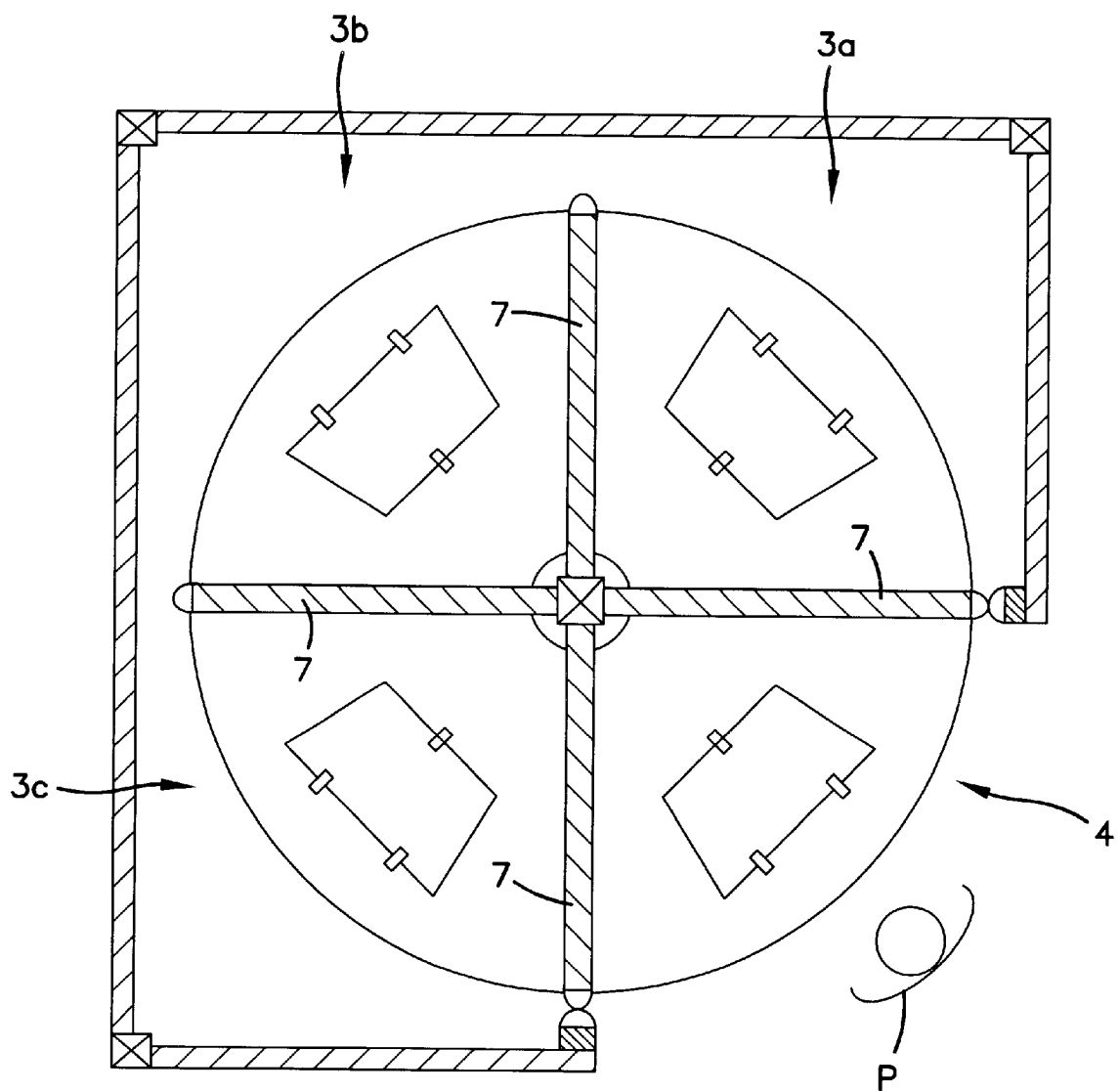
FIG. 13 is a schematic view which shows another embodiment of a processing apparatus.

In the embodiments mentioned above, the example in which the processing apparatus 1 is separated into the single processing chamber 3 and the work set chamber 4 is shown, however, it is possible to separate the processing chamber 3 into a plurality of chambers, for example, the processing chamber can be separated into first, second and third processing chambers 3a, 3b and 3c as shown in FIG. 13.

In this case, the first to third processing chambers 3a to 3c are sealed and a process is successively performed in the first, second and third processing chambers 3a, 3b and 3c.

What is claimed is:

1. A method of marking a number to a work, comprising a step of reading out said number from a card on which said number is displayed by data read-out means a plurality of times, a step of inputting each of read-out data to an arithmetic control apparatus so as to judge whether each of the data coincides, a step of transmitting the data to marking means and returning a received data to the arithmetic control apparatus from the marking means so as to judge whether the transmitting data is good, and a step of controlling the marking means to stop a marking operation by the marking means in the case that the received data is not good;

wherein the number marked by said marking means is read out by the marking read-out means, is transmitted to the arithmetic control apparatus or the computer, and is compared with the standard data so as to judge whether good or no good;

wherein the judgment of whether good or no good performed by comparing with said standard data is performed by combining at least a marking accuracy and a pattern matching degree of a character; and wherein a judgment whether good or no good on the basis of said pattern matching degree is performed such that an indefinite area slightly larger than a read-out error is provided in a boundary portion of whether good or no good in a judgment standard, the number judged to belong to the indefinite area is again judged a plurality of times by a plurality of character patterns previously registered, and thereafter in the case of being judged to still belong to the indefinite area, the judgment by viewing is performed.

2. A method of marking a number to a work, comprising a step of reading out said number from a card on which said number is displayed by data read-out means a plurality of times, a step of inputting each of the read-out data to an arithmetic control apparatus so as to judge whether each of the data coincides, a step of transmitting the data to marking means and judging whether the transmitting data is good by the marking means, and a step of controlling the marking means to stop a marking operation by the marking means in the case that the received data is not good;

wherein the number marked by said marking means is read out by the marking read-out means, is transmitted to the arithmetic control apparatus or the computer, and is compared with the standard data so as to judge whether good or no good;

wherein the judgment of whether good or no good performed by comparing with said standard data is performed by combining at least a marking accuracy and a pattern matching degree of a character; and wherein a judgment whether good or no good on the basis of said pattern matching degree is performed such that an indefinite area slightly larger than a read-out error is provided in a boundary portion of whether good or no good in a judgment standard, the number judged to belong to the indefinite area is again judged a plurality of times by a plurality of character patterns previously registered, and thereafter in the case of being judged to still belong to the indefinite area, the judgment by viewing is performed.

3. A method of marking a number as recited in claim 1, wherein the same data as the data transmitted to the marking means from said arithmetic control apparatus is input to a computer, whether the data is good is judged by comparing the data with a number independently input to the computer, and when the data is not consistent with the number, the marking means is controlled to stop the marking operation.

4. A method of marking a number as recited in claim 3, wherein the data transmitted to said computer is displayed on a display device.

5. A method of marking a number as recited in claim 3, wherein in the case that said data is not consistent, an alarm is produced.

6. A method of marking a number as recited in claim 1, wherein whether said data is good is judged with including a regulation degree of the number.

7. A method of marking a number as recited in claim 1, wherein said marking means is a dot marking apparatus.

* * * * *